United States Patent [19]
Watanabe

[11] Patent Number: 5,995,811
[45] Date of Patent: Nov. 30, 1999

[54] RADIO LOOP-BACK TEST METHOD AND SYSTEM WHICH ARE RELIABLE EVEN IN THE PRESENCE OF OUTSIDE INTERFERENCE

[75] Inventor: Nozomu Watanabe, Tokyo, Japan

[73] Assignee: NEC Corporation, Tokyo, Japan

[21] Appl. No.: 08/876,203

[22] Filed: Jun. 16, 1997

[30] Foreign Application Priority Data

Jun. 17, 1996 [JP] Japan ................................. 8-155693

[51] Int. Cl.⁶ .................................................. H04B 1/38
[52] U.S. Cl. .......................... 455/115; 455/78; 455/425
[58] Field of Search ................................... 455/423, 425, 455/78, 88, 575, 115, 84, 126, 83; 370/249, 278

[56] References Cited

U.S. PATENT DOCUMENTS

| | | | |
|---|---|---|---|
| 5,442,811 | 8/1995 | Kobayashi et al. | 455/115 |
| 5,457,812 | 10/1995 | Siira et al. | 455/115 |
| 5,574,981 | 11/1996 | Ahonen | 455/115 |
| 5,754,560 | 5/1998 | Nousiainen et al. | 455/115 |
| 5,819,165 | 10/1998 | Hulkko et al. | 455/115 |

FOREIGN PATENT DOCUMENTS

| | | |
|---|---|---|
| 690593 | 1/1996 | European Pat. Off. . |
| 58-223929 | 12/1983 | Japan . |
| 5-244054 | 9/1993 | Japan . |
| 94-29976 | 12/1994 | WIPO . |

*Primary Examiner*—Edward F. Urban
*Attorney, Agent, or Firm*—Sughrue, Mion, Zinn, Macpeak & Seas, PLLC

[57] ABSTRACT

In a radio loop-back test system for a radio apparatus in which a transmitter (15) transmits a first radio signal in response to a transmission signal and which a receiver (16) receives a second radio signal to produce a reception signal, a comparing portion (22) compares the reception signal with the transmission signal to produce a comparison result signal. An interference detection portion (23) detects whether or not the reception signal has an interference component unrelated with the first radio signal. The interference detection portion produces an interference detection signal when the reception signal has the interference component. The comparison result signal is controlled by an output control portion (24) in accordance with presence and absence of the interference detection signal.

17 Claims, 4 Drawing Sheets

RADIO LOOP-BACK TEST METHOD AND SYSTEM WHICH ARE RELIABLE EVEN IN THE PRESENCE OF OUTSIDE INTERFERENCE

BACKGROUND OF THE INVENTION

This invention relates to a radio loop-back test method for confirming normality in operation of a radio apparatus and to a radio loop-back test system using the test method.

In the manner known in the art, a radio loop-back test for the radio apparatus is carried out in order to confirm the normality of the entire apparatus including not only a control portion but also a radio portion.

As an example of the radio apparatus, a conventional radio telephone apparatus is disclosed in Japanese Unexamined Patent Publication No. 244054/93 and comprises a transmitter and a receiver. On carrying out the radio loop-back test for the radio telephone apparatus, the transmitter carries out a transmitting operation to transmit a radio signal in response to a transmission signal on a transmission time slot known in the art. The receiver carries out a receiving operation to receive the radio signal and produces a reception signal. With comparison the reception signal with the transmission signal, it is possible to judge about whether or not the radio telephone apparatus has a normal operation.

It is assumed as a particular case where an error or an interference is produced during the radio loop-back test by an external interference wave and is superposed on the reception signal. In the particular case, it is judged that the radio telephone apparatus does not have the normal operation even when both of the transmitting and the receiving operations are normal. This results in lowering reliability of the radio loop-back test. More particularly, if it is judged as a result of the radio loop-back test that the radio telephone apparatus does not have the normal operation, discrimination is impossible whether an abnormality of the apparatus or the interference causes the error.

SUMMARY OF THE INVENTION

It is therefore an object of this invention to provide a radio loop-back test method and a radio loop-back test system which are capable of reliably judging the normality of a radio apparatus.

It is another object of this invention to improve reliability of a radio loop-back test so as to improve the maintenability of a radio apparatus.

Other objects of this invention will become clear as the description proceeds.

According to an aspect of this invention, there is provided a radio loop-back test method for a radio apparatus comprising a transmitter for transmitting a first radio signal in response to a transmission signal and a receiver for receiving a second radio signal to produce a reception signal. The method comprises the steps of carrying out a loop-back test with reference to the transmission and the reception signals with making the transmitter transmit the first radio signal, detecting presence and absence of an interference on the second radio signal by the use of the reception signal with inhibiting the transmitter to transmit the first radio signal, and judging in response to the presence and the absence of the interference about whether or not the loop-back test has a result available.

According to another aspect of this invention, there is provided a radio loop-back test method for a radio apparatus comprising a transmitter for transmitting a first radio signal in response to a transmission signal and a receiver for receiving a second radio signal to produce a reception signal. The method comprises the steps of comparing the reception signal with the transmission signal to produce a comparison result signal, detecting whether or not the reception signal has an interference component unrelated with the first radio signal and producing an interference detection signal when the reception signal has the interference component, and controlling the comparison result signal in accordance with presence and absence of the interference detection signal.

According to still another aspect of this invention, there is provided a radio loop-back test system for a radio apparatus comprising a transmitter for transmitting a first radio signal in response to a transmission signal and a receiver for receiving a second radio signal to produce a reception signal. The system comprises a comparing portion connected to the transmitter and the receiver for comparing the reception signal with the transmission signal to produce a comparison result signal, an interference detection portion connected to the receiver and responsive to the reception signal for detecting whether or not the reception signal has an interference component unrelated with the first radio signal, the interference detection portion producing an interference detection signal when the reception signal has the interference component, and an output control portion connected to the comparing portion and the interference detection portion for controlling the comparison result signal in accordance with presence and absence of the interference detection signal.

According to yet another aspect of this invention, there is provided a radio loop-back test system for a radio apparatus, comprising a transmitter for transmitting, upon transmission, a radio signal corresponding to a transmission signal, a receiver received with the radio signal to produce a data signal when transmission is performed by the transmitter and to produce a field intensity signal when no transmission is performed by the transmitter, an interference detection portion connected to the receiver for detecting presence or absence of an interference wave on the radio signal with reference to the field intensity signal, the interference detection portion producing an interference detection signal, a comparing portion connected to the transmitter and the receiver for comparing, as a loop-back test, the data signal with the transmission signal to produce a comparison result signal, and an output control portion connected to the interference detection portion and the comparing portion and alternately supplied with the interference detection signal and comparison result signal for validating the comparison result signal when the interference detection signal indicates that no interference wave is detected and for invalidating the comparison result signal when the interference detection signal indicates that the interference wave is detected.

Figure 1:
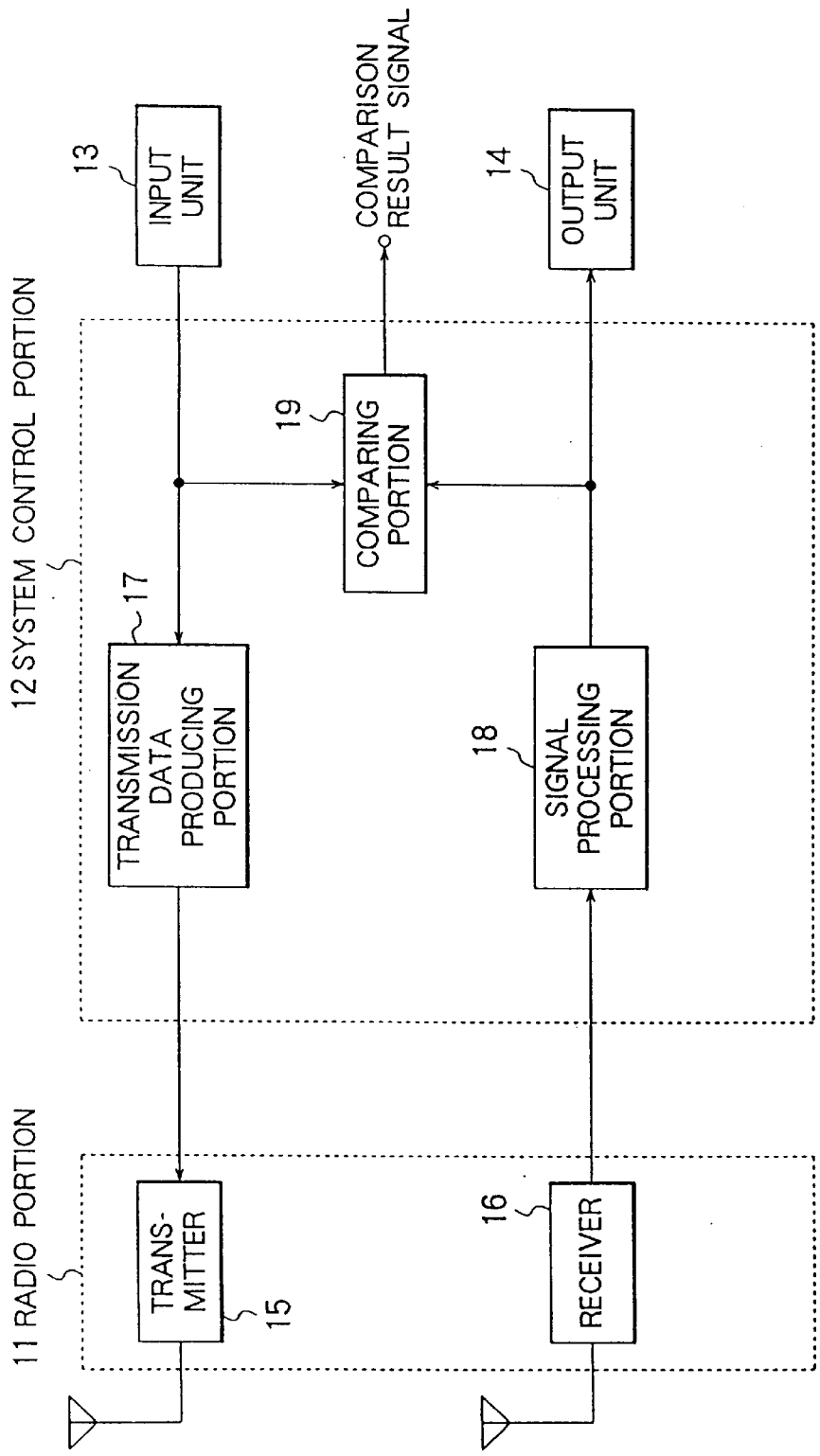
FIG. 1 is a block diagram of a radio apparatus including an earlier radio loop-back test system.

DESCRIPTION OF THE PREFERRED EMBODIMENTS:

Referring to FIG. 1, description will be made at first as regards an earlier radio loop-back test system and method for a better understanding of this invention.

The radio loop-back test system is for a radio apparatus including a radio portion 11, a system control portion 12, an input unit 13, and an output unit 14. The radio portion 11 comprises a transmitter 15 and a receiver 16. The system control portion 12 comprises a transmission data producing portion 17 connected between the transmitter 15 and the input unit 13, a signal processing portion 18 connected between the receiver 16 and the output unit 14, and a comparing portion 19 connected to the input unit 13 and the signal processing portion 18.

An input signal is supplied as a transmission signal from the input unit 13 to the comparing portion 19 and the transmission data producing portion 17. The input signal is converted by the transmission data producing portion 17 into a transmission data signal synchronized with time slots. The transmission data signal may also be called a transmission signal. The transmission data signal is transmitted by the transmitter 15 as a radio signal or a first radio signal.

A second radio signal or the above-mentioned radio signal thus transmitted is received by the receiver 16 and delivered to the signal processing portion 18 as a reception signal. The signal processing portion 18 converts the reception signal into an output signal. The output signal is supplied to the output unit 14 and the comparing portion 19. The comparing portion 19 compares the input signal with the output signal to produce a comparison result signal representative of a result of comparison. In other words, it is judged in the comparing portion 19 that the radio apparatus is normal.

Figure 2:
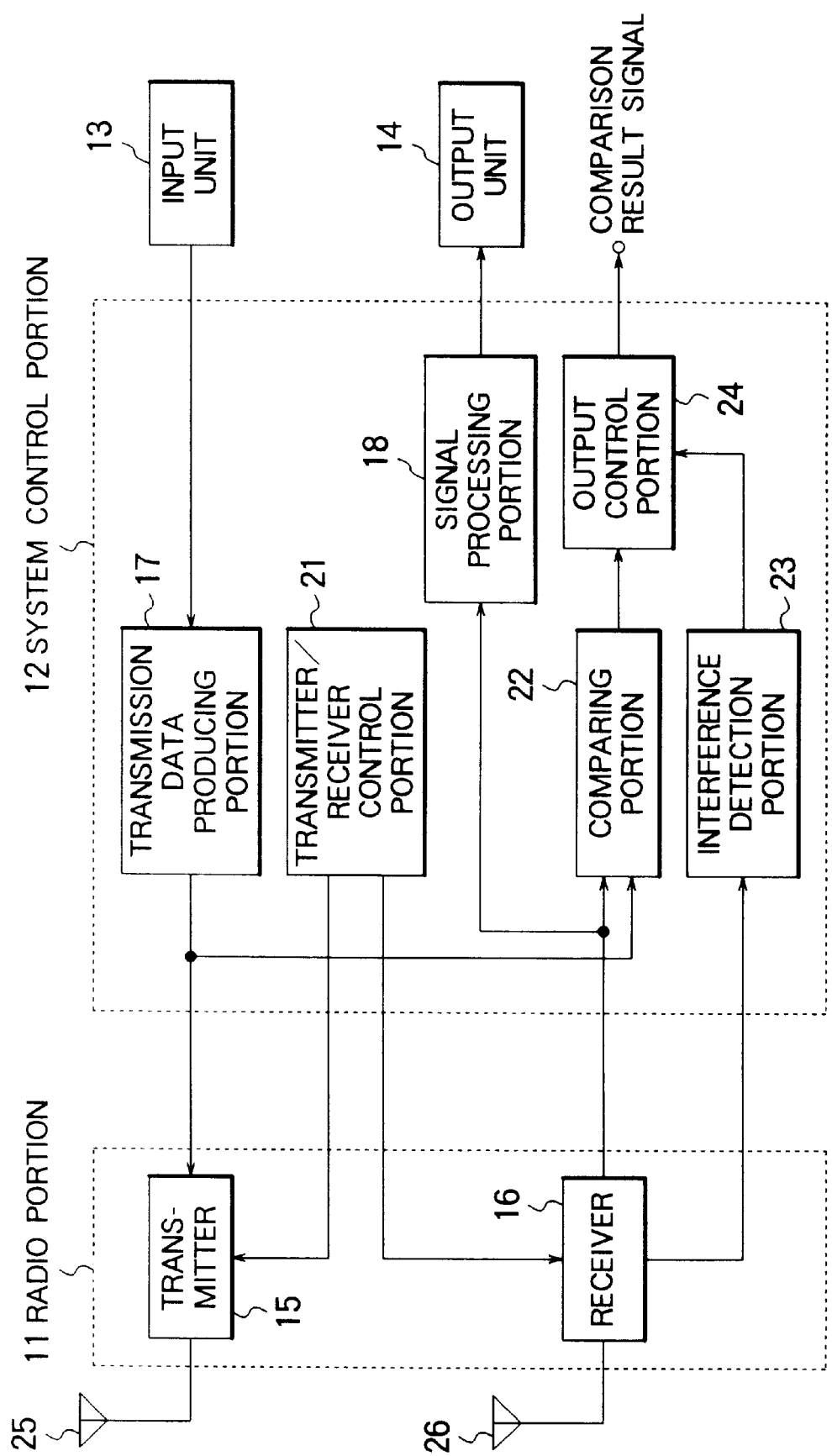
FIG. 2 is a block diagram of a radio apparatus including a radio loop-back test system according to an embodiment of this invention.

Referring to FIG. 2, the description will be made as regard the radio loop-back test system according to an embodiment of this invention.

The radio loop-back test system is for a radio apparatus of a TDD (time division duplex) system or a TDMA (time division multiple access) system in which transmission and reception are carried out at the same frequency. The radio apparatus comprises similar parts designated by like reference numerals.

In the manner which will presently be described, the radio loop-back test system comprises a transmitter/receiver control portion 21, a comparing portion 22, an interference detection portion 23, and output control portion 24.

The transmitter/receiver control portion 21 is connected to the transmitter 15 and the receiver 16 and is for producing a transmission control signal and a reception control signal each of which can be turned between ON and OFF as will later become clear.

Responsive to the transmission control signal, the transmitter 15 controls a transmission of the first radio signal. When the transmission control signal is turned ON, the transmitter 15 permits through a transmission antenna 25 to transmit the first radio signal carrying a transmission data in the manner known in the art. When the transmission control signal is turned OFF, the transmitter 15 inhibits the transmission of the first radio signal. In this event, the transmitter/receiver control portion 21 serves as a transmission control arrangement for controlling the transmitter 15 to intermittently transmit the first radio signal at a first predetermined time interval.

Responsive to the reception control signal, the receiver 16 controls a reception of the second radio signal. When the reception control signal is turned ON, the receiver 16 permits through a reception antenna 26 to receive the second radio signal that may be similar to the first radio signal. Received with the second radio signal, the receiver 16 produces a demodulated signal and a field intensity signal which are collectively called herein the reception signal. The demodulated signal corresponds to the transmission data. The field intensity signal is representative of a reception field intensity known in the art. When the reception control signal is tuned OFF, the receiver 16 inhibits the reception of the second radio signal. In this event, the transmitter/receiver control portion 21 serves as a reception control arrangement for controlling the receiver 16 to intermittently receives the second radio signal at a second predetermined time interval.

The comparing portion 22 is connected to the receiver 16 and the transmission data producing portion 17 and is for carrying out signal comparison between the demodulated signal and the transmission signal or the transmission data to produce a comparison result signal representative of a result of the signal comparison. More particularly, the comparing portion 22 judges whether or not an error is present between the demodulated signal and the transmission signal. When the error is present between the demodulated signal and the transmission signal, the comparing portion 22 produces an error detection signal as the comparison result signal.

The interference detection portion 23 is connected to the receiver 16 and responsive to the reception signal and is for detecting whether or not the field intensity signal has an interference component unrelated with the first radio signal. The interference detection portion 23 produces an interference detection signal when the field intensity signal has the interference component. More particularly, the interference detection portion 23 carries out intensity comparison between the reception field intensity and a predetermined intensity. When the reception field intensity is greater than the predetermined intensity, the interference detection portion 23 produces the interference detection signal that is representative of a result of the intensity comparison.

The output control portion 24 is connected to the comparing portion 22 and the interference detection portion 23 and is for controlling the comparison result signal in accordance with presence and absence of the interference detection signal. More particularly, the output control portion 24 judges the presence of an interference to invalidate the comparison result signal when the interference detection signal is produced to indicate that the reception field intensity is greater than the predetermined intensity. Otherwise, the output control portion 24 judges the absence of the interference to validate the comparison result signal.

Operation of each portion described above, including its timing, is controlled by a control unit which is not shown in figure.

Figure 3:
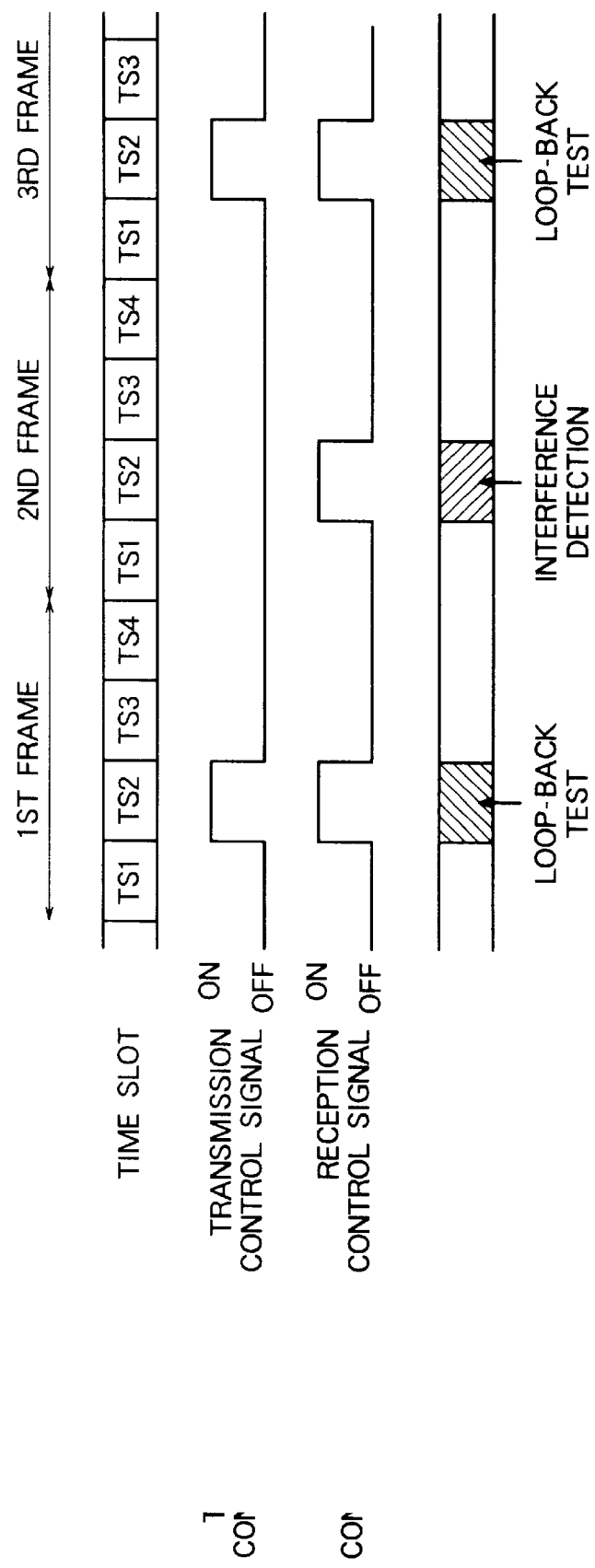
FIG. 3 is a timing chart for describing an operation of the radio loop-back test system illustrated in FIG. 2.

Referring to FIG. 3 together with FIG. 2, the description will be directed to an operation of the radio loop-back test system. In the example illustrated in FIG. 3, each of a first, a second, a third frame is composed of first, second, third, and fourth time slots TS1, TS2, TS3, TS4. By way of description, illustrated is the case where the radio loop-back test is carried out for a time slot TS2.

At first, in the first frame, the transmitter/receiver control portion 21 produces the transmission control signal and the reception control signal and turns ON the transmitter 15 and the receiver 16 in synchronism with the second time slot TS2. At this time, the first radio signal is supplied as the second radio signal to the receiver 16 through the reception antenna 26. The result of demodulation is supplied to the comparing portion 22 as the demodulation signal. The comparing portion 22 detects whether or not the error is present in the result of demodulation.

The above-mentioned detection of the error in the result of demodulation is carried out by comparing the transmission data with the demodulation signal. Alternatively, an error detection code may be added to the transmission data. in this case, the comparing portion 22 detects the error by means o f the error detection code.

Presence or absence of the error in the result of demodulation is thus detected in the comparing portion 22 and is notified to the output control portion 24 by the error detection signal. in the second time slot TS2 of a subsequent frame or the second frame, the transmitter 15 is turned OFF and the receiver 16 alone is turned ON. The receiver 16 receives a test frequency used in the loop-back test and delivers the field intensity signal to the interference detection portion 23. The interference detection portion 23 compares the field intensity signal with a predetermined threshold level. The interference detection signal representative of "presence of the interference" and "absence of the interference" is supplied to the output control portion 24 when the reception field intensity is higher and lower than the predetermined intensity, respectively.

Each operation described above is repeatedly carried out a predetermined number of times. Thereafter, when the error is present in the result of the loop-back test and when the interference is no t detected, the output control portion 24 judges that the radio apparatus has a defect. When the interference is detected even once, the loop-back test is invalidated.

Figure 4:
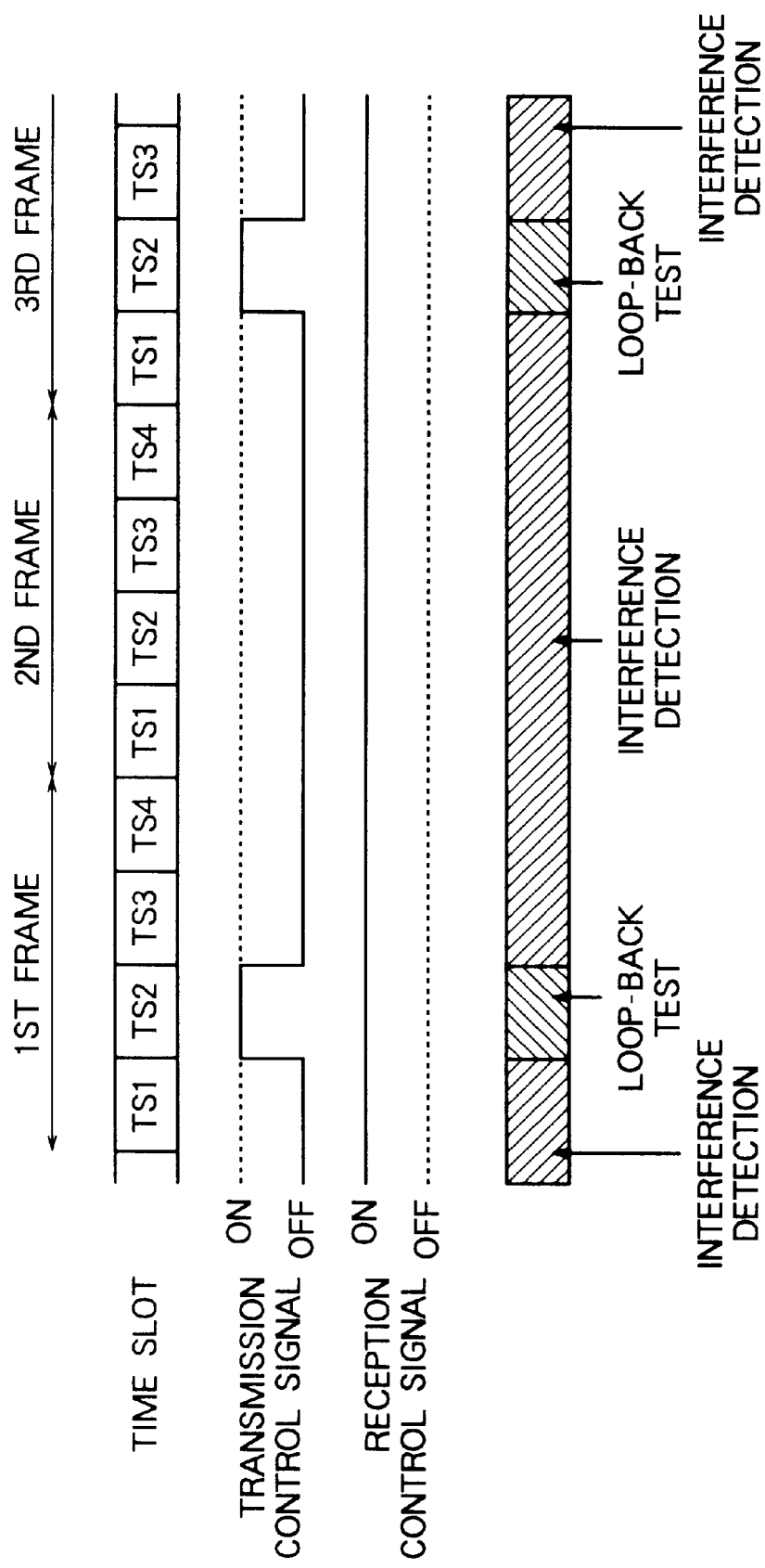
FIG. 4 is a timing chart describing an operation of a radio loop-back test system according to a second embodiment of this invention.

Next referring to FIG. 4 together with FIG. 2, the description will be made as regards a radio loop-back test system according to a second embodiment of this invention. The radio loop-back test system is different from the radio loop-back test system of FIGS. 2 and 3 only in timing of the interference detection in the interference detection portion 23.

In response to the transmission and the reception control signals, the transmitter 15 and the receiver 16 repeatedly carry out the loop-back test for alternate frames in those time slots assigned to the loop-back test. In the other time slots in which no loop-back test is carried out, the transmitter 15 alone is turned OFF while the loop-back test frequency is continuously received to detect an interference wave. During the above-mentioned operation, detection of the interference wave is carried out in the interference detection portion 23. In the manner similar to the first embodiment, the output control portion 24 judges whether the result of the radio loop-back test is validated or invalidated with reference to the presence or absence of the interference wave.

In the second embodiment having the structure described above, the detection of the interference is carried out in those time slots in which no loop-back test is carried out. The detection of the interference wave is carried out both in the frames in which the loop-back test is carried out and in the frames in which no loop-back test is carried out. It is therefore possible to detect the interference wave, such as the interference wave from a different system, which is not synchronized with the time slots being used. It is thus possible to prevent incorrect detection of the defect of the apparatus under the influence of such interference wave.

With the above-mentioned structure, this invention exhibits the following effect. During the loop-back test, detection of the interference wave against the the loop-back test frequency is intermittently carried out. When the interference wave is detected, the result of the test is neglected even if the error is present therein. The result of the test is validated only when no interference wave is detected. It is therefore possible to accurately judge the normality of the apparatus and to improve the maintenability of the radio apparatus.

While the present invention has thus far been described in connection with a few embodiments thereof, it will readily be possible for those skilled in the art to put this invention into practice in various other manners.

As described in conjunction with the above embodiments, the loop-back test judging portion judges the result of the loop-back test upon detection of the interference wave in the manner such that the loop-back test is invalidated when the interference is detected even once. This approach is based on the assumption that the interference occurs successively. In an environment such that an instantaneous interference occurs, the results of the loop-back test for a particular number of preceding and succeeding frames around a specific frame in which the interference wave is detected may be neglected as "presence of the interference". The results of the loop-back test for the other slots alone are validated.

In each embodiment, description is directed to the radio apparatus of a TDD-TDMA system. In the TDD system, the transmitter output and the reception frequency at the receiver are equal to each other so that this invention is implemented in a relatively simple structure. This system is thus suitable for the purpose of description.

In case of a frequency division multiple access system, the frequency signal different from the transmission output is received. In this case also, reception can be carried out by the use of a loop-back test reception unit for receiving the signal of the same frequency as the transmitter output. The loop-back test and the detection of the interference are alternately carried out at a predetermined interval. Thus, the loop-back test taking into account the interference condition can be carried out in the manner similar to the above-mentioned embodiments. In this case, the transmitter/receiver control portion may deliver the transmission control signal and the reception control signal also to the loop-back test judging portion. In response to these signal, the loop-back test judging portion confirms whether a current test being executed is the loop-back test or detection of the interference.

What is claimed is:

1. A radio loop-back test method for a radio apparatus comprising a transmitter for transmitting a first radio signal in response to a transmission signal and a receiver for receiving a second radio signal to produce a reception signal, said method comprising the steps of:

carrying out a loop-back test with reference to said transmission and said reception signals with making said transmitter transmit said first radio signal;

detecting presence and absence of an interference on said second radio signal by the use of said reception signal with inhibiting said transmitter to transmit said first radio signal; and judging in response to said presence and said absence of the interference about whether or not said loop-back test has a result available.

2. A radio loop-back test method as claimed in claim 1, further comprising the step of alternately repeating the carrying out and the detecting steps.

3. A radio loop-back test method as claimed in claim 2, wherein the judging step invalidates said result of the loop-back test in each of the carrying out steps when said presence of the interference is detected in at least one of the detecting steps.

4. A radio loop-back test method as claimed in claim 2, wherein, when said presence of the interference is detected in one of the detecting steps, the judging step invalidates said result of the loop-back test in each of the carrying out steps of a predetermined number of preceding and succeeding said one of the detecting step.

5. A radio loop-back test method for a radio apparatus comprising a transmitter for transmitting a first radio signal in response to a transmission signal and a receiver for receiving a second radio signal to produce a reception signal, said method comprising the steps of:

comparing said reception signal with said transmission signal to produce a comparison result signal;

detecting whether or not said reception signal has an interference component unrelated with said first radio signal and producing an interference detection signal when said reception signal has said interference component; and controlling said comparison result signal in accordance with presence and absence of said interference detection signal.

6. A radio loop-back test method as claimed in claim 5, further comprising the step of controlling said transmitter to intermittently transmit said first radio signal at a first predetermined time interval.

7. A radio loop-back test method as claimed in claim 6, further comprising the step of controlling said receiver to intermittently receive said second radio signal at a second predetermined time interval.

8. A radio loop-back test system for a radio apparatus comprising a transmitter for transmitting a first radio signal in response to a transmission signal and a receiver for receiving a second radio signal to produce a reception signal, said system comprising:

a comparing portion connected to said transmitter and said receiver for comparing said reception signal with said transmission signal to produce a comparison result signal;

an interference detection portion connected to said receiver and responsive to said reception signal for detecting whether or not said reception signal has an interference component unrelated with said first radio signal, said interference detection portion producing an interference detection signal when said reception signal has said interference component; and an output control portion connected to said comparing portion and said interference detection portion for controlling said comparison result signal in accordance with presence and absence of said interference detection signal.

9. The radio loop-back test system as claimed in claim 8, further comprising a transmission controller connected to said transmitter for controlling said transmitter to intermittently transmit said first radio signal at a first predetermined time interval.

10. A radio loop-back test system as claimed in claim 9, further comprising a reception controller connected to said receiver for controlling said receiver to intermittently receive said second radio signal at a second predetermined time interval.

11. A radio loop-back test system as claimed in claim 8, further comprising transmission control means connected to said transmitter for controlling said transmitter to intermittently transmit said first radio signal at a first predetermined time interval.

12. A radio loop-back test system as claimed in claim 4, further comprising reception control means connected to said receiver for controlling said receiver to intermittently receive said second radio signal at a second predetermined time interval.

13. A radio loop-back test system as claimed in claim 4, wherein said receiver produces as said reception signal, when said transmitter transmits said first radio signal, a data signal representative of a datum and, when said transmitter does not transmit said first radio signal, a field intensity signal representative of a reception field intensity, wherein said comparing portion is responsive to said data signal as said reception signal, said interference detection portion is responsive to said field intensity signal as said reception signal.

14. A radio loop-back test system for a radio apparatus, comprising:

a transmitter for transmitting, upon transmission, a radio signal corresponding to a transmission signal;

a receiver received with said radio signal to produce a data signal when transmission is performed by said transmitter and to produce a field intensity signal when no transmission is performed by said transmitter;

an interference detection portion connected to said receiver for detecting presence or absence of an interference wave on said radio signal with reference to said field intensity signal, said interference detection portion producing an interference detection signal;

a comparing portion connected to said transmitter and said receiver for comparing, as a loop-back test, said data signal with said transmission signal to produce a comparison result signal; and an output control portion connected to said interference detection portion and said comparing portion and alternately supplied with said interference detection signal and comparison result signal for validating said comparison result signal when said interference detection signal indicates that no interference wave is detected and for invalidating said comparison result signal when said interference detection signal indicates that the interference wave is detected.

15. A radio loop-back test system for a radio apparatus as claimed in claim 14, wherein said loop-back test carried out for a first time period and said detection of the interference wave carried out for a second time period are repeated a predetermined number of times.

16. A radio loop-back test system for a radio apparatus as claimed in claim 15, wherein said loop-back test judging portion invalidates all loop-back test results when the interference wave is detected.

17. A radio loop-back test system for a radio apparatus as claimed in claim 15, wherein said loop-back test judging portion invalidates a predetermined number of preceding and succeeding loop-back test results when the interference wave is detected.

* * * * *